(12) United States Patent
Delia et al.

(10) Patent No.: US 8,606,625 B2
(45) Date of Patent: *Dec. 10, 2013

(54) VARIABLE ROAD TOLL PREDICATED ON INSTANTANEOUS POINT-TO-POINT TRAFFIC VOLUME CALCULATION

(75) Inventors: David J. Delia, LaGrangeville, NY (US); Wayne Michael Delia, Poughkeepsie, NY (US); Glenn Stuart Knickerbocker, Lomgstpm, NY (US); Ann Katherine Walla, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,421

(22) Filed: Jul. 9, 2012

(65) Prior Publication Data

US 2012/0278138 A1 Nov. 1, 2012

Related U.S. Application Data

(63) Continuation of application No. 12/365,460, filed on Feb. 4, 2009, now Pat. No. 8,219,443.

(51) Int. Cl.
*G07B 15/00* (2011.01)
*G07B 15/02* (2011.01)
*G06Q 10/00* (2012.01)
*G06F 17/00* (2006.01)
*G06G 7/00* (2006.01)

(52) U.S. Cl.
USPC ............................... 705/13; 705/1.1; 705/400

(58) Field of Classification Search
USPC .......... 705/1.1, 7.11–7.42, 13, 14.1, 26.1, 30, 705/400, 348; 340/1.1
See application file for complete search history.

(56) References Cited

U.S. PATENT DOCUMENTS

| 2003/0020634 | A1 | 1/2003 | Banerjee et al. |
| 2003/0069683 | A1 | 4/2003 | Lapidot et al. |
| 2004/0119609 | A1 | 6/2004 | Solomon |
| 2007/0278300 | A1 | 12/2007 | Dawson et al. |
| 2008/0065568 | A1 | 3/2008 | Dawson et al. |
| 2009/0295599 | A1 | 12/2009 | Coffee et al. |
| 2010/0153125 | A1 | 6/2010 | Hamilton et al. |

OTHER PUBLICATIONS

J.A. Paulos, "A mathematical Accent", http://www.cut-the-knot.org/do_you_know/mentality.shtml, Jul. 4, 2008.

*Primary Examiner* — George Chen
(74) *Attorney, Agent, or Firm* — Scully, Scott, Murphy & Presser, P.C.; William Schiesser, Esq.

(57) ABSTRACT

A method, a system and a computer program product are directed towards determination of a variable toll for a particular target vehicle using a particular point-to-point travel segment of a particular toll road. The variable toll is calculated predicated upon a deviation of an instantaneous point-to-point traffic volume for the particular target vehicle exiting the toll road in comparison with an arbitrarily determined baseline point-to-point traffic volume. The instantaneous point-to-point traffic volume includes vehicles traveling at least a portion of the same point-to-point travel segment as the target vehicle during an effective time interval when the target vehicle traveled the point-to-point travel segment.

15 Claims, 3 Drawing Sheets

VARIABLE ROAD TOLL PREDICATED ON INSTANTANEOUS POINT-TO-POINT TRAFFIC VOLUME CALCULATION

RELATED APPLICATIONS

This application is a continuation application of U.S. application Ser. No. 12/365,460, filed Feb. 4, 2009.

BACKGROUND

1. Field of the Invention

The invention relates generally to toll roads. More particularly, the invention relates to determination of variable tolls within toll roads.

2. Description of the Related Art

Toll roads typically provide a useful and viable means for expediting vehicular traffic that is generally intended to travel a comparatively long distance (i.e., greater than 10 miles). Toll roads typically effect this result by providing for a limited and controlled toll road access at comparatively long distance intervals (i.e., greater than 10 miles), while also providing for a superior toll road design and construction (i.e., in particular comparison with secondary roads) that facilitates a generally higher vehicular speed when using a toll road. In exchange for providing the limited and controlled toll road access and also providing the superior toll road design and construction that facilitates the generally higher vehicular speed when using the toll road, a pertinent governmental authority, quasi-governmental authority or private authority typically assesses a user fee (i.e., a toll or tariff) for toll road use.

While toll roads are a well recognized means for safely and efficiently effecting expedited traffic flow over long distances, toll roads are nonetheless not entirely without problems in achieving that desirable end result. In particular, toll roads are often themselves subject to excessive traffic loads during peak travel times, and for that reason travel time advantages that are usually anticipated by toll roads in comparison with alternative primary or secondary roads may not be realized at all times.

Various incentive schemes or disincentive schemes for optimizing toll road use are known in the art. Such incentive schemes or disincentive schemes are generally predicated upon arbitrarily increased tolls or arbitrarily decreased tolls during arbitrarily determined periods of anticipated toll road over utilization or anticipated toll road under utilization.

Since efficient toll road utilization is a desirable end result from the perspective of both the toll road management authorities and the toll road users, desirable are readily implemented methods, systems and apparatus that provide for efficient toll road utilization.

SUMMARY

The invention provides a method, a system and a computer program product for determining a variable road toll that may assist in optimizing toll road utilization. The method, the system and the computer program product provide for variable road toll determination within the context of an instantaneous point-to-point travel traffic volume for a particular target vehicle entering and exiting a particular point-to-point travel segment of a toll road, in comparison with an arbitrarily determined baseline traffic volume for the point-to-point travel segment of the toll road, and then applying an adjustment (i.e., a surcharge or a discount) to a baseline point-to-point toll for the point-to-point travel segment predicated upon a difference between the instantaneous point-to-point traffic volume and the baseline point-to-point traffic volume.

Within the invention, the instantaneous point-to-point traffic volume for the particular exiting vehicle may be calculated predicated upon toll road vehicular entry and exit transactions only, absent any direct monitoring of point-to-point traffic volume on the toll road for the particular point-to-point travel segment from which the target vehicle is exiting. The instantaneous point-to-point traffic volume is calculated as a number of vehicles traveling at least a portion of the point-to-point travel segment traveled by the particular target vehicle during an effective time interval when the particular target vehicle is traveling the point-to-point travel segment.

In accordance with the foregoing description, the system, the method and the computer program product of the invention thus provide for a toll road utilization (i.e., traffic congestion) pricing scheme on-demand and predicated, preferably solely, upon a readily calculated instantaneous point-to-point traffic volume for a particular target vehicle and for a particular point-to-point travel segment within a toll road in comparison with an arbitrarily determined baseline point-to-point traffic volume for the particular point-to-point travel segment within the toll road.

A particular method for determining a variable toll for a toll road in accordance with the invention includes determining for a plurality of point-to-point travel segments on a toll road: (1) a plurality of baseline point-to-point traffic volumes; (2) a plurality of baseline point-to-point tolls; and (3) a plurality of baseline point-to-point toll adjustments predicated upon a plurality of instantaneous point-to-point traffic volume deviations from the plurality of baseline point-to-point traffic volumes. The method also includes determining for the toll road a particular instantaneous point-to-point traffic volume for a particular target vehicle exiting from a particular point-to-point travel segment. The method also includes determining for the particular point-to-point travel segment an instantaneous point-to-point toll based upon the baseline point-to-point toll and a baseline point-to-point toll adjustment predicated upon the particular instantaneous point-to-point traffic volume. The method also includes applying the instantaneous point-to-point toll to the particular target vehicle.

A particular system for determining a variable toll for a toll road in accordance with the invention includes means for determining for a plurality of point-to-point travel segments on a toll road: (1) a plurality of baseline point-to-point traffic volumes; (2) a plurality of baseline point-to-point tolls; and (3) a plurality of baseline point-to-point toll adjustments predicated upon a plurality of instantaneous point-to-point traffic volume deviations from the plurality of baseline point-to-point traffic volumes. The system also includes means for determining for the toll road a particular instantaneous point-to-point traffic volume for a particular target vehicle exiting from a particular point-to-point travel segment. The system also includes means for determining for the particular point-to-point travel segment an instantaneous point-to-point toll based upon the baseline point-to-point toll and a baseline point-to-point toll adjustment predicated upon the particular instantaneous point-to-point traffic volume. The system also includes means for applying the instantaneous point-to-point toll to the particular target vehicle.

A particular computer program product for determining a variable toll for a toll road in accordance with the invention includes a tangible computer readable medium having encoded therein computer readable instructions. The instructions provide for determining for a plurality of point-to-point travel segments on a toll road: (1) a plurality of baseline point-to-point traffic volumes; (2) a plurality of baseline point-to-point tolls; and (3) a plurality of baseline point-to-point toll adjustments predicated upon a plurality of instantaneous point-to-point traffic volume deviations from the plurality of baseline point-to-point traffic volumes. The instructions also provide for determining for the toll road a particular instantaneous point-to-point traffic volume for a particular target vehicle exiting from a particular point-to-point travel segment. The instructions also provide for determining for the particular point-to-point travel segment an instantaneous point-to-point toll based upon the baseline point-to-point toll and a baseline point-to-point toll adjustment predicated upon the particular instantaneous point-to-point traffic volume. The instructions also provide for applying the instantaneous point-to-point toll to the particular target vehicle.

BRIEF DESCRIPTION OF THE DRAWING

The objects, features and advantages of the invention are understood within the context of the Description of the Preferred Embodiment, as set forth below. The Description of the Preferred Embodiment is understood within the context of the sole accompanying drawing, that forms a material part of this disclosure, wherein.

DESCRIPTION OF THE PREFERRED EMBODIMENT

The invention, which includes a method for allocating variable road tolls predicated upon an instantaneous point-to-point traffic volume within a particular point-to-point travel segment of a toll road, a system for allocating variable road tolls predicated upon the instantaneous point-to-point traffic volume within the particular point-to-point travel segment of the toll road and a computer program product for allocating variable road tolls predicated upon the instantaneous point-to-point traffic volume within the particular point-to-point travel segment of the toll road, is understood within the context of the description set forth below. The description set forth below is understood within the context of the drawings described above.

Figure 1:
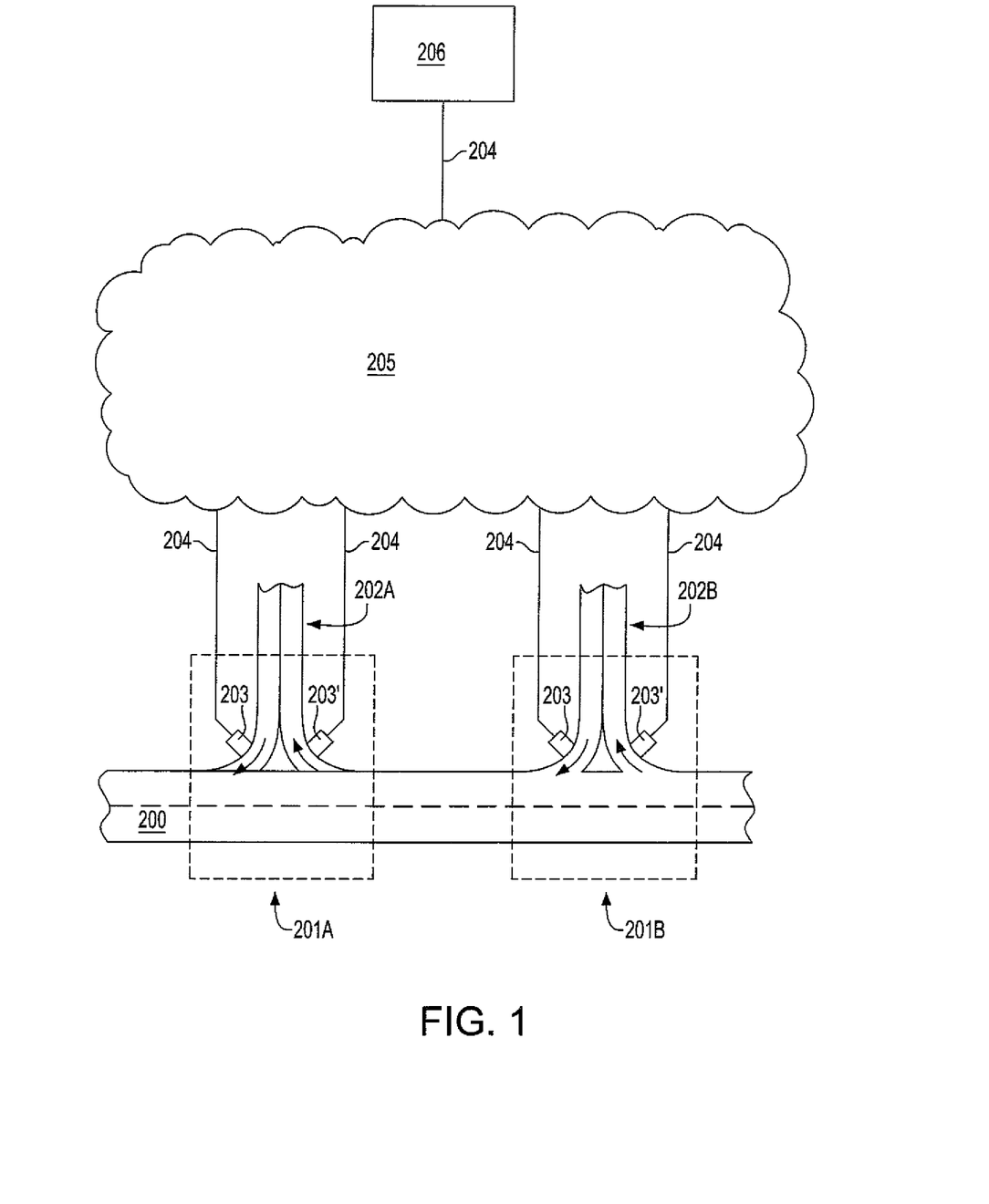
FIG. 1 shows a schematic diagram illustrating a generalized physical embodiment of components for implementation of a variable road toll system in accordance with the invention.

FIG. 1 shows a schematic diagram illustrating a generalized arrangement of components within a variable road toll system in accordance with a generalized embodiment of the invention.

FIG. 1 shows a toll road 200 including interchanges 201A and 201B where vehicles may both exit and enter the toll road 200 onto or from secondary roads 202A and 202B. The exit and entrance of vehicles from the toll road 200 onto or from the secondary roads 202A and 202B is monitored or controlled by entrance transducers 203 and exit transducers 203'. The entrance transducers 203 and the exit transducers 203' may be in the format of physically staffed toll booths, or in an alternative, the entrance transducers 203 and the exit transducers 203' may be in the format of wireless radio frequency identification (RFID) transmitter and receiver systems.

The entrance transducers 203 and the exit transducers 203' are connected to a network 205 (i.e. including but not limited to a wireless network or a hardwired network) through communication links 204 that may also include, but are not necessarily limited to, wireless communication links or hard wired communication links. Finally, a centralized computer 206 is also connected to the network 205 through an additional communications link 204.

As will be understood within the context of further discussion below, the invention seeks to apply variable tolls to vehicles (that are not otherwise shown) that enter and exit the toll road at a particular point-to-point travel segment of the toll road.

Figure 2:
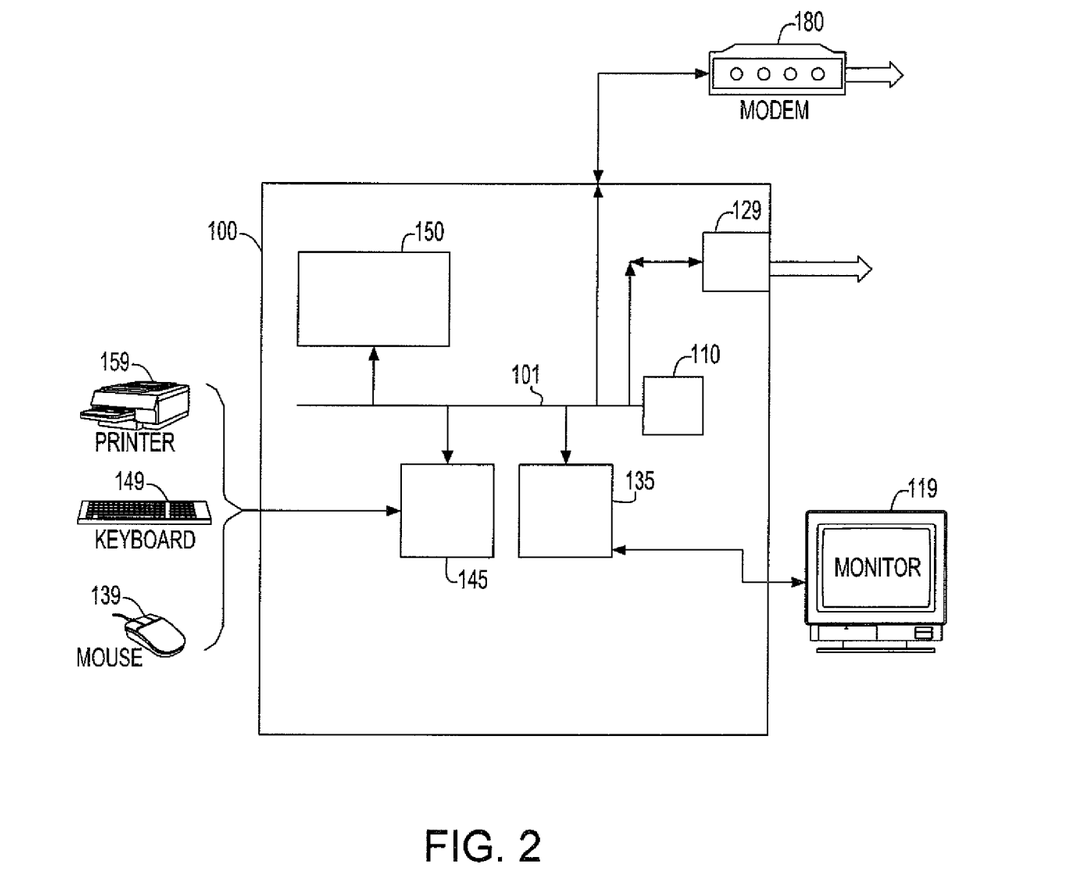
FIG. 2 shows a schematic diagram illustrating an interrelationship of hardware components within a system in accordance with the invention.

FIG. 2 shows a schematic cross-sectional diagram illustrating general computer based hardware components within a system in accordance with the invention.

The computer-based system 100 that is illustrated in FIG. 2 herein facilitates the method by which the present invention may be carried out. The computer system 100 includes a processing unit 110, which houses a processor, memory and other systems components that implement a general purpose processing system or computer that may execute a computer program product. The computer program product may comprise media, for example a compact storage medium such as a compact disc, which may be read by the processing unit 110 through a disc drive 129, or by any means known to the skilled artisan for providing the computer program product to the general purpose processing system for execution thereby.

The computer program product comprises all the respective features enabling the implementation of the methods described herein, and which—when loaded in a computer system—is able to carry out these methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 110 (as mentioned) or may be located on a remote system such as a server (not shown), coupled to processing unit 110, via a network interface such as an Ethernet interface. Monitor 119, mouse 139 and keyboard 149 are coupled to the processing unit 145, to provide user interaction. Printer 159 is shown coupled to the processing unit 110 via a network connection 145, but may be coupled directly to the processing unit 110.

More specifically, as shown in FIG. 2, the computer system 100, includes one or more processors or processing units 110, a system memory 150, and an address/data bus structure 101 that connects various system components together. For instance, the bus 101 connects the processor 110 to the system memory 150. The bus 101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 100 includes one or more monitors 119 and, operator input devices such as a keyboard 149, and a pointing device 139 (e.g., a "mouse") for entering commands and information into computer, data storage devices, and implements an operating system such as Linux, various Unix, Macintosh, MS Windows OS, or others.

The computing system 100 additionally includes: computer readable media, including a variety of types of volatile and non-volatile media, each of which can be removable or non-removable. For example, system memory 150 includes computer readable media in the form of volatile memory, such as random access memory (RAM), and non-volatile memory, such as read only memory (ROM). The ROM may include an input/output system (BIOS) that contains the basic routines that help to transfer information between elements within computer device 100, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 101 by one or more data media interfaces (not shown). Alternatively, the hard disk drive, magnetic disk drive, and optical disk drive can be connected to the system bus 101 by a SCSI interface (not shown), or other coupling mechanism. Although not shown, the computer 100 can include other types of computer readable media. Generally, the above-identified computer readable media provide non-volatile storage of computer readable instructions, data structures, program modules, and other data for use by computer 100. For instance, the readable media can store an operating system (O/S), one or more application programs, such as video editing client software applications, and/or other program modules and program data for enabling video editing operations via Graphical User Interface (GUI).

Input/output interfaces 145 are provided that couple the input devices to the processing unit 110. More generally, input devices can be coupled to the computer 100 through any kind of interface and bus structures, such as a parallel port, serial port, universal serial bus (USB) port, etc. The computer environment 100 also includes the display device 119 and a video adapter card 135 that couples the display device 119 to the bus 101. In addition to the display device 119, the computer environment 100 can include other output peripheral devices, such as speakers (not shown), a printer, etc. I/O interfaces 145 are used to couple these other output devices to the computer 100.

As mentioned, computer system 100 is adapted to operate in a networked environment using logical connections to one or more computers, such as a server device that may include all of the features discussed above with respect to computer device 100, or some subset thereof. It is understood that any type of network can be used to couple the computer system 100 with the server device, such as a local area network (LAN), or a wide area network (WAN) (such as the Internet). When implemented in a LAN networking environment, the computer 100 connects to local network via a network interface or adapter that support Gigabit over Copper Ethernet as well as Jumbo Frames. When implemented in a WAN networking environment, the computer 100 connects to the WAN via a high speed cable/dsl modem 180 or some other connection means. The cable/dsl modem 180 can be located internal or external to computer 100, and can be connected to the bus 101 via the I/O interfaces 145 or other appropriate coupling mechanism. Although not illustrated, the computing environment 100 can provide wireless communication functionality for connecting computer 100 with remote computing device, e.g., an application server (e.g., via modulated radio signals, modulated infrared signals, etc.).

As suggested above, and as will be appreciated by one skilled in the art, the invention may be embodied within the context of a method, a system or a computer program product. Accordingly, the present invention may take the form of an entirely hardware embodiment, an entirely software embodiment (including firmware, resident software, micro-code, etc.) or an embodiment combining hardware and software aspects that may be generally referred to as a "circuit," a "module" or a "system." Furthermore, the present invention may take the form of a computer program product embodied in any tangible medium of expression having computer usable program code embodied in the medium.

Any one or more computer usable or computer readable media may be employed. The computer usable or computer readable medium may include, for example, but is not limited to, an electronic, magnetic, optical, infrared or semiconductor system, apparatus, device or propagation medium. More specific, but non-exhaustive, computer readable media may include, but are not necessarily limited to an electrical connection having one or more wires, a portable computer diskette, a hard disk, a random access memory, a read only memory, an erasable programmable read only memory, an optical fiber, a portable compact disk read only memory, an optical storage device, a transmission media such as those supporting the Internet or an intranet, or a magnetic storage device. Note that the computer usable or computer readable medium may comprise a paper medium or another suitable medium upon which a program is printed, as the program can be electronically captured, for instance, by optical scanning of the paper or other media and then compiled, interpreted or otherwise processed in a suitable manner if necessary, and then stored in a computer memory. In the context of the foregoing descriptions of computer readable media, a computer readable or computer usable medium may be any medium that may contain, store, communicate and/or propagate a program for use by, or in connection with, an instruction execution system, apparatus or device. The computer usable medium may include a propagated data signal with the computer useable program code embodied therewith, either in base and or as part of a carrier wave. The computer usable program code may be transmitted using any appropriate transmission medium including but not limited to wireless, wireline, optical fiber cable, RF, etc. transmission media.

Computer program code for carrying out operations of the present invention may be written in any combination or one of more programming languages, including but not limited to an object oriented program language such as Java, Smalltalk, C++, and the line of conventional procedural programming languages, such as the "C" programming language or other similar programming languages. The program code may execute entirely on the user's computer, partly on the user's computer as a stand-alone software package, or alternatively partly on the user's computer and partly on a remote computer or server. In the later scenario, the remote computer may be connected to the users computer through any type of network, including but not limited to a local area network or a wide area network, or the connection may be made to an external computer (for example, and without limitation, through the Internet using an Internet Service Provider).

The present invention is described below with reference to the foregoing schematic process flow diagram (i.e., flowchart) illustration including reference to methods, apparatus, systems and computer program products according to the embodiments of the invention. It will be understood that each block of the flowchart illustration and/or block diagram and combinations of blocks in the flowchart illustration and/or block diagram can be implemented by computer program instructions. These computer program instructions may be provided to a processor of a general purpose computer, a special purpose computer or an other data programming processing apparatus to produce a machine such that the instructions which execute via the processor of the computer or other programmable data processing apparatus create means for implementing the functions/acts specified in the flowchart and/or block diagram or blocks.

The computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that instructions which execute on the computer or other programmable apparatus provide processes for implementing the functions/acts specified in the flowchart and/or block diagram block or blocks.

Figure 3:
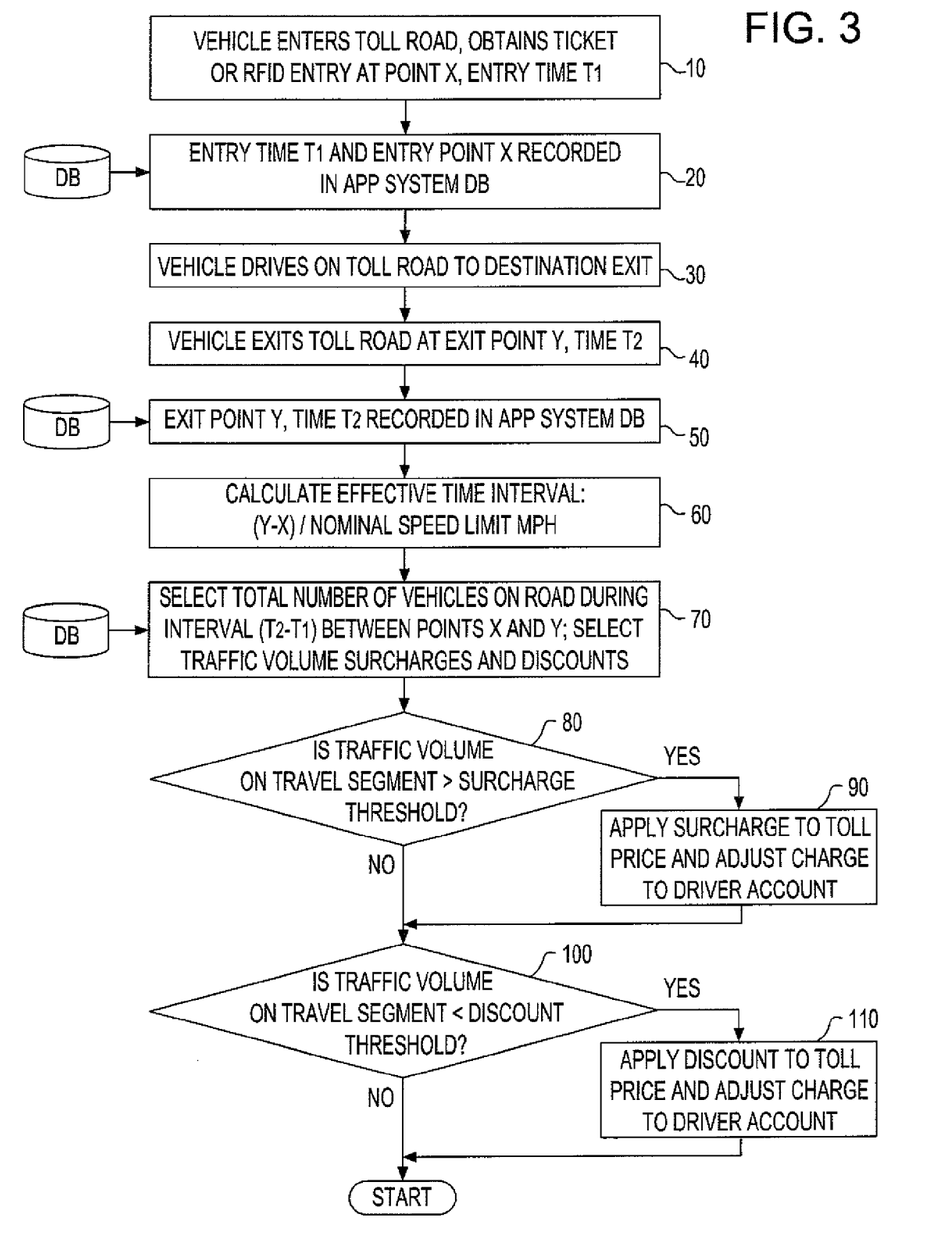
FIG. 3 shows a schematic process flow diagram (i.e., a flowchart) illustrating a plurality of process steps in accordance with a method in accordance with the invention that may be used in accordance with the system in accordance with the invention that may further include a computer program product in accordance with the invention.

FIG. 3 shows a schematic process flow diagram (i.e., a flowchart) illustrating progressive process stages in executing a variable road toll determination method predicated upon an instantaneous point-to-point traffic volume calculation for a target vehicle exiting a particular point-to-point travel segment of a particular toll road in accordance with a particular embodiment of the invention. This particular embodiment of the invention comprises a sole preferred embodiment of the invention.

The schematic process flow diagram of FIG. 1 illustrates the architecture, functionality and operation of possible implementations of methods, systems and computer program products according to various implementations of the present invention. In this regard, each block of the schematic process flow diagram may represent a module, segment or portion of code which comprises one or more executable instructions for implementing the specified logical functions. It should be noted that in some alternative implementations the functions noted in the block may occur out of the order noted in the schematic process flow diagram. For example, two blocks shown in succession may in fact be executed substantially concurrently, or the blocks may be sometimes executed in reverse order, depending on the functionality of the blocks involved. It will also be noted that each block of the block diagram or flowchart diagrams and/or flowchart illustrations can be implemented by special purpose hardware based systems that perform the specified functions or acts, or combinations of special purpose hardware and computer instructions.

In accordance with process step 10, the schematic process flow diagram of FIG. 1 provides that a particular target vehicle enters a particular toll road and obtains an entrance ticket, or enters a radio frequency identification (RFID) transaction, at an entry point X and at an entry time T1.

The particular method, system and computer program product in accordance with the invention are applicable within the context of any of several vehicles, including but not limited to passenger vehicles and commercial vehicles of all sizes and types. The particular method, system and computer program product of the invention are also applicable to any size and location of toll road, presuming that such a toll road includes a plurality of entrance points and a plurality of exit points. However, the particular method, system and computer program product in accordance with the invention are more commonly applicable to toll roads that are generally shorter in length (i.e., generally less than 200 miles). Also, the particular method, system and computer program product in accordance with the invention are also more generally applicable for short to moderate point-to-point travel segments (i.e., from 10 to 100 miles) on those toll roads under circumstances where a particular target vehicle that enters a toll road encounters an instantaneous point-to-point traffic volume on the toll road that is relatively constant (i.e., within +/−20 percent standard deviation over a particular point-to-point travel segment and a particular travel time period on the toll road).

In accordance with process step 20, the schematic process flow diagram of FIG. 1 provides that the entry point X and the entry time T1 of the target vehicle with respect to the toll road are recorded within an application system database.

Additional details regarding the application system database in accordance with the embodiment and the invention are disclosed above.

In accordance with process step 30, the schematic process flow diagram of FIG. 1 provides that the target vehicle travels on the toll road to a particular destination exit.

In accordance with process step 40, the schematic process flow diagram of FIG. 1 provides that the target vehicle exits the toll road at an exit point Y and at a time T2.

In accordance with process step 50, the schematic process flow diagram of FIG. 1 provides that exit point Y and the time T2 are recorded in the application system database DB.

In accordance with process step 60, the schematic process flow diagram of FIG. 1 provides (within the context of a program executing on a server device that communicates with the database) for calculation of an effective time interval $T2'-T1'$ for the presence of the target vehicle on the toll road as $(Y-X)$/nominal speed limit. This particular time interval is assumed to end when the target vehicle exits the toll road. Thus, the method, the system and the computer program product do not use an actual elapsed time for the target vehicle on the toll road, but rather the method, the system and the computer program product of this particular embodiment consider and assume that a particular target vehicle travels at a nominal speed limit (or alternatively an other arbitrarily designated speed) for a complete duration of a point-to-point travel segment on the toll road, absent any break in the point-to-point travel time.

In accordance with process step 70, the schematic process flow diagram of FIG. 1 provides that there is determined for the effective time interval $T2'-T1'$ that ends with the time T2 a total number of vehicles that have used at least a portion of the toll road between points X and Y (i.e., an instantaneous point-to-point traffic volume). Also in accordance with process step 70 within the schematic process flow diagram of FIG. 1, there is determined a series of toll adjustments (i.e., surcharges and discounts) with respect to a nominal baseline point-to-point toll and a baseline point-to-point traffic volume for the point-to-point travel segment between points X and Y.

In accordance with inquiry box 80 within the schematic process flow diagram of FIG. 1, the method of the invention provides for an inquiry whether the instantaneous point-to point traffic volume within the point-to-point travel segment X-Y during the effective time interval traveled by the target vehicle exceeds a surcharge threshold. If so, and in accordance with process step 90, a surcharge is applied to an exit toll assessed against the target vehicle.

In accordance with inquiry box 100 within the schematic process flow diagram of FIG. 1, the method of the invention provides for an inquiry whether the instantaneous point-to-point traffic volume within the point-to-point travel segment X-Y during the effective time interval traveled by the target vehicle is below a discount threshold. If so, and in accordance with process step 110, a discount is applied to an exit toll assessed against the target vehicle.

The schematic process flow diagram of FIG. 3 then comes to an end.

To more fully illustrate operation of the embodiment within the context of the schematic process flow diagram of FIG. 1, a particular example of operation of the embodiment may be desirable. This particular example assumes a set of application programs which is based upon a relational table matrix of toll road infrastructural data (i.e., date for each entry point ID (including but not limited to X and Y) each exit point ID (including but not limited to X and Y)) a distance in miles between each entry point and each exit point, a baseline point-to-point toll between each entry point and each exit point and a baseline point-to-point traffic volume corresponding to a normal point-to-point traffic volume (i.e., toll road throughput). Table I as follows provides, for example, such a tabulation of such infrastructural data.

TABLE I

INFRASTRUCTURE

| Entry (MPost) | Exit (MPost) | Miles | Base Toll | Speed | Baseline Volume |
|---|---|---|---|---|---|
| 13 (07) | 14 (18) | 11 | 0.40 | 65 | 2500 |
| 14 (18) | 15 (30) | 12 | 0.50 | 65 | 2500 |
| 15 (30) | 16 (45) | 15 | 0.85 | 65 | 2000 |
| 16 (45) | 17 (60) | 15 | 1.00 | 65 | 2000 |
| 17 (60) | 18 (76) | 16 | 0.70 | 65 | 2000 |
| 18 (76) | 19 (91) | 15 | 0.70 | 65 | 2000 |
| 17 (60) | 19 (91) | 31 | 1.35 | 65 | 3500 |
| 19 (91) | 20 (101) | 10 | 0.45 | 65 | 2000 |

As is illustrated in Table I, the entry points and exit points are intended as correlated to specific milepost locations located along a particular toll road.

This particular embodiment also contemplates a generalized activity table for overall activity within the particular toll road within the context of a specific effective time period for which the target vehicle is using the toll road. Such an activity table may include a Ticket ID, an entry point, an entry point time stamp, an exit point and an exit point timestamp. Table II as follows, for example, provides such an activity table.

TABLE II

ACTIVITY

| Seq. | Ticket | Entry | Timestamp | Exit | Timestamp |
|---|---|---|---|---|---|
| 1. | 11793294 | 17 | 2008-04-13-14:20:00 | [19] | [2008-04-13-14:48:00] |
| 2. | 11793317 | 18 | 2008-04-13-14:37:00 | | |
| 3. | 11793324 | 16 | 2008-04-13-14:28:00 | | |
| 4. | 11793345 | 18 | 2008-04-13-14:32:00 | 19 | 2008-14-13-14:44:00 |
| 5. | 11793366 | 17 | 2008-04-13-14:45:00 | | |
| 6. | 11793389 | 14 | 2008-04-13-13:36:00 | | |
| 7. | 11793396 | 15 | 2008-04-13-14:00:00 | 18 | 2008-14-13-14:38:00 |
| 8. | 11793422 | 13 | 2008-04-13-14:19:00 | 14 | 2008-14-13-14:32:00 |
| 9. | 11793437 | 20 | 2008-04-13-14:33:00 | | |
| 10. | 11793449 | 18 | 2008-04-13-14:03:00 | 19 | 2008-04-13-14:17:00 |

As an example, it is assumed that it is desirable to determine whether a volume based toll adjustment (i.e., a surcharge or a discount) may be assessed with respect to a vehicle corresponding with sequence number 1, ticket 11793294 for a target vehicle that has entered the toll road in accordance with the foregoing embodiment at exit 17 and at an entry timestamp of 2008-04-13-14:20:00. For calculation purposes it is assumed that this particular target vehicle exits the toll road at exit 19 with an exit timestamp 2008-04-13-14:48:00. In a first instance, the record for sequence number 1 ticket 11793294 is updated appropriately (as illustrated in brackets), in order to ascertain and explicitly state the foregoing toll road exit conditions.

The effective time interval T2'-T1' is then calculated as 31 miles/65 miles per hour=28 minutes, where the effective time interval ends at 2008-04-13-14:48:00, and coincidentally, but not necessarily, is coextensive with the actual time interval.

The embodiment then seeks to evaluate the remaining activity log entries to ascertain whether any of the remaining activity log entries corresponds with a vehicle that is deemed to have traveled at least a portion of the toll road between the point-to-point travel segment X-Y within the effective time interval from 2008-04-13-14:20:00 to 2008-04-13-14:48:00. Within the context of such an evaluation, the same arbitrary vehicular speed is applied to vehicles that correspond with the activity log entries as is arbitrarily applied to the target vehicle.

The vehicle that corresponds with sequence number 2 is deemed to fulfill the foregoing conditions (i.e., point-to-point travel segment and effective time interval) insofar as that particular vehicle entered the toll road at exit 18 during the effective time interval that the target vehicle traveled the point-to-point travel segment between exits 17 and 19.

The vehicle that corresponds with sequence number 3 is deemed to fulfill the foregoing conditions insofar as that particular vehicle entered the toll road at exit 16 sufficiently early to have used the point-to-point travel segment traveled by the target vehicle during the effective time interval.

The vehicle that corresponds with sequence number 4 is deemed to fulfill the forgoing conditions insofar as that vehicle has clearly traveled a portion of the point-to-point travel segment traveled by the target vehicle during the effective time interval.

The vehicle that corresponds with sequence number 5 is deemed to fulfill the foregoing conditions by entering the toll road at the same entry point as the target vehicle within the effective time interval.

The vehicle that corresponds with sequence number 6 is deemed to fulfill the foregoing conditions insofar as although entering the toll road at a remote entry point 14, this particular vehicle is still on the toll road and deemed to have traveled a portion of the point-to-point travel segment traveled by the target vehicle during the effective time interval.

The vehicle that corresponds with sequence number 7 is deemed to fulfill the foregoing conditions insofar as that vehicle has clearly traveled a portion of the point-to-point travel segment traveled by the target vehicle during the effective time interval.

The vehicle that corresponds with sequence number 8 is not deemed to fulfill the foregoing conditions insofar as that vehicle has not traveled any portion of the point-to-point travel segment traveled by the target vehicle.

The vehicle that corresponds with sequence number 9 is not deemed to fulfill the forgoing conditions insofar as that vehicle has not traveled any portion of the point-to-point travel segment traveled by the target vehicle.

The vehicle that corresponds with sequence number 10 is not deemed to fulfill the foregoing conditions insofar that vehicle did not travel during the effective time interval.

Having quantified a number of vehicles that have traveled at least a portion of the point-to-point travel segment (i.e., exits X-Y or exits 17-19) traveled by the target vehicle during the effective time interval, this particular example then provides for determination of a toll adjustment. Such a toll adjustment may also be obtained from tabular data of a specific toll adjustment as a function of a deviation from a baseline point-to-point traffic volume.

Such tabular data is shown, for example in Table III, as follows.

TABLE III

TOLL ADJUSTMENT

| Percent Baseline Volume | Toll Adjustment |
| --- | --- |
| Less than 50 | −25% |
| Less than 75 | −10% |
| 100 | — |
| Greater than 125 | +10% |
| Greater than 150 | +25% |

Finally, within this particular embodiment as well as the example, a pertinent toll adjustment is applied to and assessed against the target vehicle when exiting the point-to-point travel segment of the toll road. Such an assessment may be effected by means of a radio frequency identification tag assessment, or by means of a simple calculation that may already be recorded on a paper ticket.

Within the context of the forgoing example, the schematic process flow diagram of FIG. 1 provides the basis for a method, a system and a computer program product in accordance with a particular sole embodiment of the invention. Such a method, system and computer program product are intended to provide for determination of a variable toll for a toll road where the variable toll is predicated upon a deviation of an instantaneous point-to-point traffic volume for a target vehicle exiting a particular point-to-point travel segment of a toll road from a baseline point-to-point traffic volume for the point-to-point travel segment of the toll road as calculated for an effective time interval that the target vehicle travels a point-to-point toll travel segment of the toll road.

As is illustrated above, and as is understood by a person skilled in the art, such a variable toll is determined using toll road entry and toll road exit data only, absent any vehicular or environmental monitoring of the toll road.

The preferred embodiment and example are illustrative of the invention rather than limiting of the invention. Revisions and modifications may be made to methods, systems and computer program products in accordance with the preferred embodiment and example of the invention, while still providing a method, system and computer program product in accordance with the invention, further in accordance with the accompanying claims.

What is claimed is:

1. A method for determining a variable toll for a toll road comprising:
    determining for a plurality of point-to-point travel segments on a toll road:
        a plurality of baseline point-to-point traffic volumes;
        a plurality of baseline point-to-point tolls; and
        a plurality of baseline point-to-point toll adjustments predicated upon a plurality of instantaneous point-to-point traffic volume deviations from the plurality of baseline point-to-point traffic volumes;
    determining for the toll road a particular instantaneous point-to-point traffic volume for a particular target vehicle exiting from a particular point-to-point travel segment, said instantaneous point-to-point traffic volume determining based on an effective time interval determined by a distance traveled by the particular target vehicle and an arbitrary vehicular speed;
    determining for the particular point-to-point travel segment an instantaneous point-to-point toll based upon the baseline point-to-point toll and a baseline point-to-point toll adjustment predicated upon the particular instantaneous point-to-point traffic volume; and
    applying the instantaneous point-to-point toll to the particular target vehicle, wherein a programmed processor device performs one or more said determining said particular instantaneous point-to-point traffic volume for a particular target vehicle, said determining for the particular point-to-point travel segment an instantaneous point-to-point toll, and said applying.

2. The method of claim 1 wherein the determining the particular instantaneous point-to-point traffic volume is yields a number of vehicles traveling at least a portion of the particular point-to-point travel segment during the effective time interval.

3. The method of claim 2 wherein the number of vehicles traveling at least the portion of the particular point-to-point travel segment is calculated using a general activity table for the toll road and the arbitrary vehicular speed.

4. The method of claim 1, performed without using any vehicular or environmental sensor monitoring of the toll road between a toll road entrance and toll road exit.

5. The method of claim 1 wherein the determining the particular instantaneous point-to-point traffic volume uses toll road entry data and toll road exit data only.

6. A system for determining a variable toll for a toll road comprising:
    means for determining for a plurality of point-to-point travel segments on a toll road:
        a plurality of baseline point-to-point traffic volumes;
        a plurality of baseline point-to-point tolls; and
        a plurality of baseline point-to-point toll adjustments predicated upon a plurality of instantaneous point-to-point traffic volume deviations from the plurality of baseline point-to-point traffic volumes;
    means for determining for the toll road a particular instantaneous point-to-point traffic volume for a particular target vehicle exiting from a particular point-to-point travel segment, said means for determining further calculates the particular instantaneous point-to-point traffic volume using an effective time interval determined by a distance traveled by the particular target vehicle and an arbitrary vehicular speed;

means for determining for the particular point-to-point travel segment an instantaneous point-to-point toll based upon the baseline point-to-point toll and a baseline point-to-point toll adjustment predicated upon the particular instantaneous point-to-point traffic volume; and means for applying the instantaneous point-to-point toll to the particular target vehicle.

7. The system of claim 6 where the plurality of baseline point-to-point toll adjustments comprise discounts.

8. The system of claim 6 wherein:
the particular instantaneous point-to-point traffic volume is determined as a number of vehicles traveling at least a portion of the particular point-to-point travel segment during the effective time interval; and
the number of vehicles traveling at least the portion of the particular point-to-point travel segment is calculated using a general activity table for the toll road and the arbitrary vehicular speed.

9. The system of claim 6 wherein the means for comprise computer means.

10. The system of claim 6 where the plurality of baseline point-to-point toll adjustments comprise surcharges.

11. A computer program product for determining a variable toll for a toll road comprising a tangible, non-transitory computer medium, said tangible, non-transitory computer medium having encoded therein computer readable instructions for:

determining for a plurality of point-to-point travel segments on a toll road:
a plurality of baseline point-to-point traffic volumes;
a plurality of baseline point-to-point tolls; and
a plurality of baseline point-to-point toll adjustments predicated upon a plurality of instantaneous point-to-point traffic volume deviations from the plurality of baseline point-to-point traffic volumes;

determining for the toll road a particular instantaneous point-to-point traffic volume for a particular target vehicle exiting from a particular point-to-point travel segment, said instantaneous point-to-point traffic volume determining based on an effective time interval determined by a distance traveled by the particular target vehicle and an arbitrary vehicular speed;

determining for the particular point-to-point travel segment an instantaneous point-to-point toll based upon the baseline point-to-point toll and a baseline point-to-point toll adjustment predicated upon the particular instantaneous point-to-point traffic volume; and applying the instantaneous point-to-point toll to the particular target vehicle.

12. The computer program product of claim 11 wherein the particular instantaneous point-to-point traffic volume is determined as a number of vehicles traveling at least a portion of the particular point-to-point travel segment during the effective time period.

13. The computer program product of claim 12 wherein the number of vehicles traveling at least the portion of the particular point-to-point travel segment is calculated using a general activity table for the toll road and the arbitrary vehicular speed.

14. The computer program product of claim 11 where the plurality of baseline point-to-point toll adjustments comprise surcharges.

15. The computer program product of claim 11 where the plurality of baseline point-to-point toll adjustments comprise discounts.

* * * * *